US011846396B2

(12) United States Patent
Hsia

(10) Patent No.: US 11,846,396 B2
(45) Date of Patent: Dec. 19, 2023

(54) LINEAR SOLID-STATE LIGHTING WITH BIDIRECTIONAL CIRCUITS

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 144 days.

(21) Appl. No.: 17/717,838

(22) Filed: Apr. 11, 2022

(65) Prior Publication Data

US 2022/0235907 A1 Jul. 28, 2022

Related U.S. Application Data

(63) Continuation-in-part of application No. 17/696,780, filed on Mar. 16, 2022, which is a continuation-in-part of application No. 17/405,203, filed on Aug. 18, 2021, now Pat. No. 11,283,291, which is a continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a
(Continued)

(51) Int. Cl.
| | |
|---|---|
| *F21V 23/00* | (2015.01) |
| *H05B 45/50* | (2022.01) |
| *F21K 9/278* | (2016.01) |
| *F21V 25/00* | (2006.01) |
| *F21V 23/04* | (2006.01) |
| *F21Y 115/10* | (2016.01) |

(52) U.S. Cl.
CPC ............ *F21K 9/278* (2016.08); *F21V 23/003* (2013.01); *F21V 25/00* (2013.01); *H05B 45/50* (2020.01); *F21V 23/0442* (2013.01); *F21Y 2115/10* (2016.08); *Y02B 20/30* (2013.01)

(58) Field of Classification Search
None
See application file for complete search history.

(56) References Cited

U.S. PATENT DOCUMENTS

| | | | |
|---|---|---|---|
| 2014/0240966 A1* | 8/2014 | Garcia | H05B 45/10 362/183 |
| 2016/0328928 A1* | 11/2016 | Lutz | H02J 7/00309 |
| 2021/0159725 A1* | 5/2021 | Hsia | G01R 31/3835 |

\* cited by examiner

*Primary Examiner* — Anh Q Tran
(74) *Attorney, Agent, or Firm* — Han IP PLLC; Andy M. Han

(57) ABSTRACT

A linear light-emitting diode (LED) lamp comprising a normally-operated portion and an emergency-operated portion is used to replace a luminaire operated only in a normal mode with alternate-current (AC) mains. The normally-operated portion comprises a fly-back converter whereas the emergency-operated portion comprises a rechargeable battery, a bidirectional circuit, a boost converter, a self-diagnostic circuit, and a control circuit. The linear LED lamp can auto-switch from the normal mode to an emergency mode according to availability of the AC mains and whether a rechargeable battery test is initiated. The bidirectional circuit is configured to convey a forward electric current and a reverse electric current to and from the rechargeable battery, respectively. The self-diagnostic circuit is configured to provide multiple sequences and to auto-evaluate battery performance according to the multiple sequences. During an auto-evaluation period, a terminal voltage on the rechargeable battery is examined with test results displayed in a status indicator.

19 Claims, 4 Drawing Sheets

Related U.S. Application Data continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450, filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation of application No. 13/525,249, filed on Jun. 15, 2012, now Pat. No. 8,749,167.

LINEAR SOLID-STATE LIGHTING WITH BIDIRECTIONAL CIRCUITS

CROSS-REFERENCE TO RELATED APPLICATIONS

The present disclosure is part of a continuation-in-part (CIP) application of U.S. patent application Ser. No. 17/696,780, filed 16 Mar. 2022, which is part of CIP application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021, which is part of CIP application of U.S. patent application Ser. No. 17/313,988, filed 6 May 2021 and issued as U.S. Pat. No. 11,264,831 on 1 Mar. 2022, which is part of CIP application of U.S. patent application Ser. No. 17/213,519, filed 26 Mar. 2021 and issued as U.S. Pat. No. 11,271,422 on 8 Mar. 2022, which is part of CIP application of U.S. patent application Ser. No. 17/151,606, filed 18 Jan. 2021 and issued as U.S. Pat. No. 11,259,386 on 22 Feb. 2022, which is part of CIP application of U.S. patent application Ser. No. 17/122,942, filed 15 Dec. 2020 and issued as U.S. Pat. No. 11,265,991 on 1 Mar. 2022, which is part of CIP application of U.S. patent application Ser. No. 17/099,450, filed 16 Nov. 2020 and issued as U.S. Pat. No. 11,264,830 on 1 Mar. 2022, which is part of CIP application of U.S. patent application Ser. No. 17/076,748, filed 21 Oct. 2020 and issued as U.S. Pat. No. 11,271,388 on 8 Mar. 2022, which is part of CIP application of U.S. patent application Ser. No. 17/026,903, filed 21 Sep. 2020 and issued as U.S. Pat. No. 11,271,421 on 8 Mar. 2022, which is part of CIP application of U.S. patent application Ser. No. 17/016,296, filed 9 Sep. 2020 and issued as U.S. Pat. No. 11,259,374 on 22 Feb. 2022, which is part of CIP application of U.S. patent application Ser. No. 16/989,016, filed 10 Aug. 2020 and issued as U.S. Pat. No. 11,122,658 on 14 Sep. 2021, which is part of CIP application of U.S. patent application Ser. No. 16/929,540, filed 15 Jul. 2020 and issued as U.S. Pat. No. 11,116,057 on 7 Sep. 2021, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020 and issued as U.S. Pat. No. 11,172,551 on 9 Nov. 2021, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp that includes a bidirectional circuit and a self-diagnostic circuit to operate thereof and to auto-test charging and discharging current of a rechargeable battery in operating such a dual mode LED lamp at all times.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. It is, therefore, the manufacturers' responsibility to design an LED lamp, an LED luminaire, or an LED lighting system with a self-diagnostic mechanism such that after the LED lamp or the LED luminaire is installed on a ceiling or a high place in a room, the self-diagnostic mechanism can work with an emergency battery backup system to periodically auto-test charging and discharging current to meet regulatory requirements without safety issues. In the emergency battery backup system, an essential part is controlling a forward electric current and a reverse electric current to and from a rechargeable battery to properly operate the multi-function LED lamps with the emergency light package integrated with the normal lighting.

SUMMARY

A linear LED lamp is used to replace a fluorescent or an LED lamp normally operated with the AC mains in a normal mode. The linear LED lamp comprises an emergency-operated portion and one or more LED arrays with a forward voltage across thereof. The emergency-operated portion comprises a rechargeable battery, a boost converter circuit configured to use a power from the rechargeable battery and to provide an emergency power (i.e., a voltage and a current) to drive the one or more LED arrays when the line voltage from the AC mains is unavailable. The linear LED lamp further comprises a normally-operated portion originally designed to receive the line voltage from the AC mains for general lighting applications. The normally-operated portion comprises at least two electrical conductors "L" and "N", at least one full-wave rectifier, and a fly-back converter circuit. The at least one full-wave rectifier is configured to convert the line voltage from the AC mains into a primary direct-current (DC) voltage. In other words, the at least two electrical conductors "L" and "N" are coupled to an un-switched power, in which the normally-operated portion cannot be turned off when the linear LED lamp is not in use or during nighttime. This un-switched power ensures that the rechargeable battery always receives the un-switched power from the line voltage. The fly-back converter circuit comprises a transformer and a power switching circuit. The power switching circuit is coupled to the at least one full-wave rectifier and configured to allow the fly-back converter circuit 303 to generate a second LED driving current to power up the one or more LED arrays at a full power when the line voltage is available. The transformer comprises a ground reference, electrically isolated from a negative (−) port of the at least one full-wave rectifier. The one or more LED arrays comprises a first terminal LED+ and a second terminal LED− configured to receive an LED driving current from the first terminal LED+ and to return from the second terminal LED− to either the boost converter circuit or the normally-operated portion, depending on which one is an LED driving current source. The fly-back converter circuit is a normally-operated current source configured to provide the second LED driving current to the one or more LED arrays to operate thereon.

The emergency-operated portion is configured to receive the primary DC voltage via a diode. The emergency-operated portion further comprises a primary control circuit, a bidirectional circuit, and a major power source configured to pre-powers the emergency-operated portion. The bidirectional circuit is configured to receive a power from the major power source via a port "A". The rechargeable battery comprises a high-potential electrode and a low-potential electrode with a terminal voltage across thereon. The major power source is an isolated step-down converter configured to convert the primary DC voltage into a second DC voltage that charges the rechargeable battery to reach a nominal value of the terminal voltage. Please note that the terminal voltage of the rechargeable battery may be slightly less than the nominal value because the rechargeable battery ages or an ambient temperature is below an optimum operating temperature. When the rechargeable battery badly ages or goes wrong, the terminal voltage may be far from the nominal value. That is why the rechargeable battery test is needed to ensure that the rechargeable battery is working all the time, especially in an event of power outage. The bidirectional circuit comprises one or more electronic switches configured to control a forward electric current and a reverse electric current to and from the rechargeable battery. In the bidirectional circuit, the one or more electronic switches comprise a first electronic switch and a second electronic switch. The first electronic switch is configured to receive a first set of one or more signals from the primary control circuit via a link to regulate the forward electric current to the rechargeable battery via the second electronic switch. The primary control circuit further comprises a test portion configured to examine a fraction of the terminal voltage on the rechargeable battery. When a rated terminal voltage is reached, the primary control circuit is configured to disable a charging process via the bidirectional circuit. Conversely. when the terminal voltage drops below the rated terminal voltage, the primary control circuit is configured to enable a charging process via the bidirectional circuit. The primary control circuit may further comprise a line-voltage monitor configured to detect whether the line voltage is available or not. According to this information, the primary control circuit is configured to enable and to disable the boost converter circuit. Enabling the boost converter circuit comprises two processes. First, the bidirectional circuit must control the reverse electric current from the rechargeable battery to reach the boost converter circuit via a link. Second, the primary control circuit must send a logically-high level signal to the boost converter circuit via a port "C". The ground reference is electrically coupled to the low-potential electrode to ease a charging current to flow into the rechargeable battery and to return to the major power source, completing a power transfer.

The primary control circuit comprises a second control circuit comprising a third electronic switch and a fourth electronic switch. The third electronic switch and the fourth electronic switch are configured to control whether the second LED driving current is supplied into the one or more LED arrays or not. The third electronic switch is configured to turn on the fourth electronic switch, thereby allowing the second LED driving current to flow into the one or more LED arrays. The second control circuit may further comprise a signaling device configured to enable and disable the fly-back converter circuit via a link. That is, when the boost converter circuit is turned on by the primary control circuit, the signaling device sends a signal to turn off the fly-back converter circuit, and vice versa. The fourth electronic switch may comprise a first at least one metal-oxide-semiconductor field-effect transistor (MOSFET) configured to couple between the fly-back converter circuit and the one or more LED arrays and to controllably relay the second LED driving current to reach the one or more LED arrays via a loop from a port, a down-link, the fourth electronic switch, an uplink, to the port of LED+. The third electronic switch may comprise at least one bipolar junction transistor (BJT) coupled to the first at least one MOSFET and configured to receive the logic high level or the logic low level to respectively turn the first at least one MOSFET on or off. When the first at least one MOSFET is turned off, the second LED driving current is interrupted with an output of the fly-back converter circuit open-circuited. The second control circuit may be configured to forbid the second LED driving current to flow into the one or more LED arrays during the rechargeable battery test.

The primary control circuit further comprises a self-diagnostic circuit comprising one or more timers. Each of the one or more timers respectively comprises multiple time delays, wherein the multiple time delays respectively further comprise a first time delay and a second time delay, wherein, upon an initiation of each of the one or more timers, the first time delay begins with an input voltage applied on the self-diagnostic circuit, wherein, at an end of the first time delay, the output of the self-diagnostic circuit is activated to reach the logic high level and remains activated so as to enable the boost converter circuit for the second time delay, wherein, at an end of the second time delay, the output of the self-diagnostic circuit is inactivated to drop to the logic low level to disable the boost converter circuit, and wherein a duration over the second time delay is configured to allow the self-diagnostic circuit to integrate with the test portion and to perform a rechargeable battery test. When the rechargeable battery test is initiated, the second control circuit is configured to forbid the second LED driving current to flow into the one or more LED arrays. The primary control circuit further comprises a peripheral circuit configured to sample a fraction of the LED forward voltage and to deliver to the test portion to examine over the duration of the next time delay when the rechargeable battery test is initiated. The primary control circuit further comprises at least one status indicator configured to show a result of the rechargeable battery test. The primary control circuit further comprises a test switch configured to manually initiate the rechargeable battery test. When the rechargeable battery test is manually initiated, the self-diagnostic circuit is configured to ignore the first time delay and to activate the output of the self-diagnostic circuit to reach the logic high level and remains activated so as to enable the boost converter circuit for the second time delay, wherein, at an end of the second time delay, the output of the self-diagnostic circuit is inactivated to drop to the logic low level to disable the boost converter circuit, and wherein a duration over the second time delay is configured to allow the self-diagnostic circuit to integrate with the test portion and to perform a rechargeable battery test, as mentioned above. The test switch is further configured to manually cause or trigger the self-diagnostic circuit to terminate the rechargeable battery test that is in progress. The emergency-operated portion may further comprise a voltage regulator configured to adapt either an output voltage from the major power source or the terminal voltage to an operating voltage of the primary control circuit to operate thereof. An operation of the voltage regulator involves a power switching between the major power source and the rechargeable battery via the bidirectional circuit.

The boost converter circuit comprises one or more switches, an inductor, a boost control circuit, and at least one capacitor. The boost converter circuit is configured to cut off a constant source of power from the rechargeable battery into controllable increments of energy pulses, followed by a filter associated with the at least one capacitor to rebuild the controllable increments of energy pulses back into a regulated source of usable output power providing a first LED driving current to drive the one or more LED arrays. The boost converter circuit may comprise a diode configured to block an output current when the one or more switches is closed. When the one or more switches is opened, the diode is configured to conduct the output current and to boost an output voltage greater than the forward voltage of the one or more LED arrays. In this sense, the diode may function as a switch. The one or more switches may include such a switch. See FIG. 5 for further discussions. An output port "B" of the boost converter circuit is directly coupled to LED+. This means that the one or more LED arrays is configured to receive the first LED driving current from the boost converter circuit as long as the boost converter circuit is enabled and operated.

In a second embodiment of the linear LED lamp, the bidirectional circuit further comprises a first control circuit configured to regulate the forward electric current to flow into the rechargeable battery. The one or more electronic switches comprise a first set of one or more electronic switches and a second set of one or more electronic switches. The forward electric current is allowed to flow into the rechargeable battery via the second set of one or more electronic switches. The first set of one or more electronic switches are configured to receive a second set of one or more signals sent from the primary control circuit and to allow the reverse electric current to flow out of the rechargeable battery. The second set of one or more electronic switches comprise at least one transistor circuit configured to activate the boost converter circuit. In other words, the bidirectional circuit is configured to receive the second set of one or more signals from the primary control circuit and to allow the reverse electric current to flow out of the rechargeable battery and to apply the terminal voltage to the boost converter circuit to supply with energy and power up the boost control circuit to activate the boost converter circuit via a port "D".

In a third embodiment of the linear LED lamp, the major power source is configured to receive a power from a second full-wave rectifier, taking advantages of two independent power sources from two different full-wave rectifiers such that the normally-operated portion can be turned off at any time without affecting functionality of the emergency-operated portion. The normally-operated portion comprises at least two electrical conductors "L" and "N", a first full-wave rectifier, and the fly-back converter circuit. The at least two electrical conductors "L" and "N" are configured to couple to "L" and "N" via a power switch. The first full-wave rectifier is configured to convert the line voltage from the AC mains into a primary DC voltage. In other words, the at least two electrical conductors "L" and "N" are coupled to a switched power, in which the normally-operated portion can be turned off when the linear LED lamp is not in use any time The linear LED lamp further comprises a first end and a second end opposite to the first end. The first full-wave rectifier and the second full-wave rectifier are configured to independently receive the line voltage. Either of the first end and the second end comprises at least two electrical conductors, wherein each of the at least two electrical conductors is respectively coupled to the first full-wave rectifier and the second full-wave rectifier. The second full-wave rectifier is configured to power the major power source at all times.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "main", a "primary", a "secondary", a "preliminary", an "initial", a "first", a "second", a "third", and so forth does not necessarily represent a part that is mentioned in an ordinal manner, but a particular one.

DETAILED DESCRIPTION OF THE INVENTION

Figure 1:
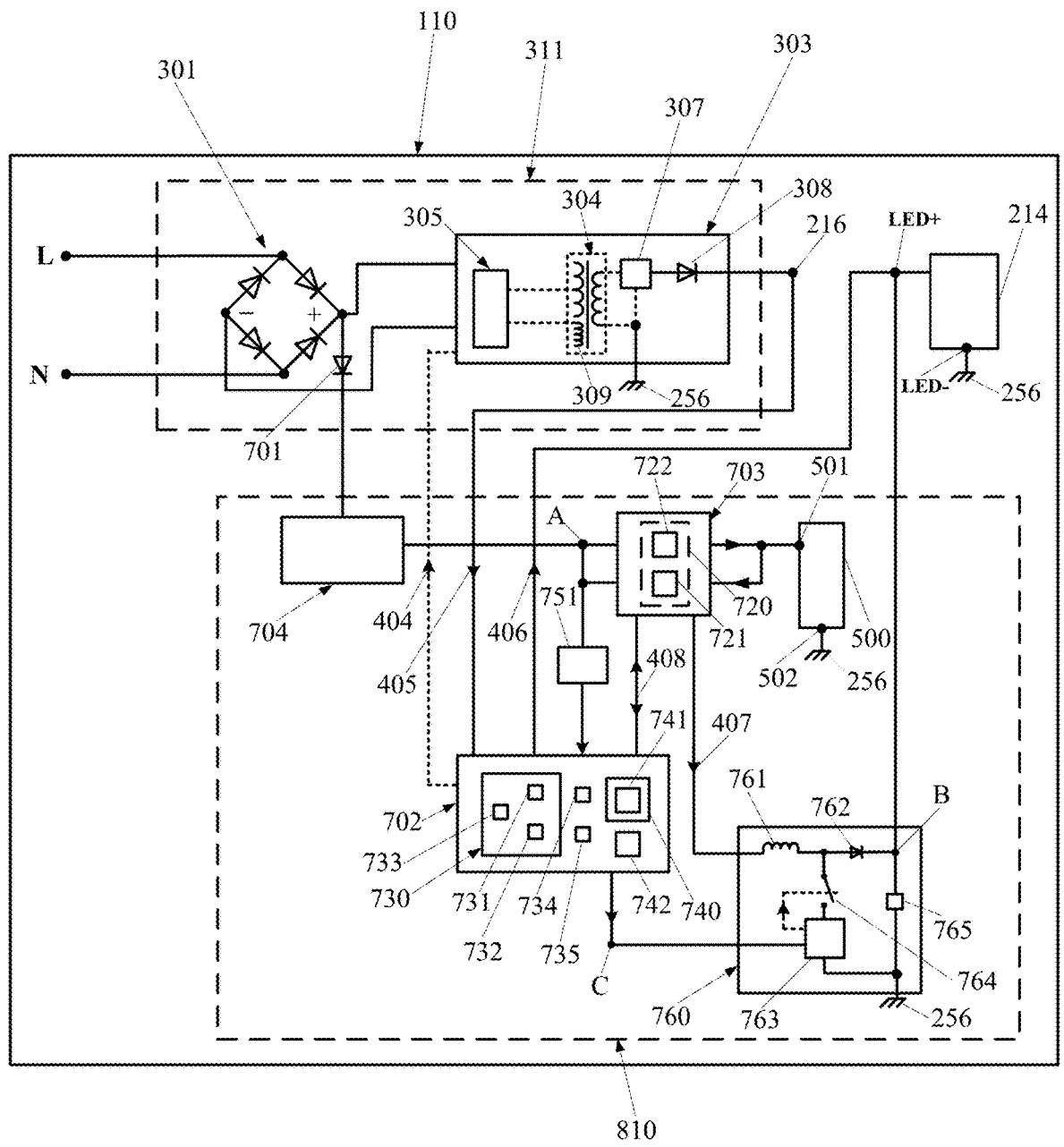
FIG. 1 is a block diagram of a linear LED lamp according to the present disclosure.

FIG. 1 is a block diagram of a linear light-emitting diode (LED) lamp according to the present disclosure. A linear LED lamp 110 is used to replace a fluorescent or an LED lamp normally operated with the AC mains in a normal mode. In FIG. 1, the linear LED lamp 110 comprises an emergency-operated portion 810 and one or more LED arrays 214 with a forward voltage across thereof. The emergency-operated portion 810 comprises a rechargeable battery 500, a boost converter circuit 760 configured to use a power from the rechargeable battery 500 and to provide an emergency power (i.e., a voltage and a current) to drive the one or more LED arrays 214 when the line voltage from the AC mains is unavailable. The linear LED lamp 110 further comprises a normally-operated portion 311 originally designed to receive the line voltage from the AC mains for general lighting applications. The normally-operated portion 311 comprises at least two electrical conductors "L" and "N", at least one full-wave rectifier 301, and a fly-back converter circuit 303. The at least one full-wave rectifier 301 is configured to convert the line voltage from the AC mains into a primary DC voltage. In other words, the at least two electrical conductors "L" and "N" are coupled to an un-switched power, in which the normally-operated portion 311 cannot be turned off when the linear LED lamp 110 is not in use or during nighttime. This un-switched power ensures that the rechargeable battery 500 always receives the un-switched power from the line voltage. The fly-back converter circuit 303 comprises a transformer 304 and a power switching circuit 305. The power switching circuit 305 is coupled to the at least one full-wave rectifier 301 and configured to allow the fly-back converter circuit 303 to generate a second LED driving current to power up the one or more LED arrays 214 at a full power when the line voltage is available. The fly-back converter circuit 303 may further comprise a rectifier 307 and additional diode 308. The transformer 304 comprises a ground reference 256, electrically isolated from a negative (−) port of the at least one full-wave rectifier 301. The transformer 304 may further comprise an auxiliary winding 309 configured to provide a sustaining power and to operate the fly-back converter circuit 303. The one or more LED arrays 214 comprises a first terminal LED+ and a second terminal LED− configured to receive an LED driving current from the first terminal LED+ and to return from the second terminal LED− to either the boost converter circuit 760 or the normally-operated portion 311, depending on which one is an LED driving current source. The fly-back converter circuit 303 is a normally-operated current source configured to provide the second LED driving current to the one or more LED arrays 214 to operate thereon.

In FIG. 1, the emergency-operated portion 810 is configured to receive the primary DC voltage via a diode 701. The emergency-operated portion 810 further comprises a primary control circuit 702, a bidirectional circuit 703, and a major power source 704 configured to couple to the at least one full-wave rectifier 301 and to build a basic DC power, pre-powering the emergency-operated portion 810. In that sense, the major power source 704 is configured to provide a DC power to the bidirectional circuit 703 and the rechargeable battery 500. The bidirectional circuit 703 is configured to receive the DC power from the major power source 704 via a port "A". The rechargeable battery 500 comprises a high-potential electrode 501 and a low-potential electrode 502 with a terminal voltage across thereon. The major power source 704 is an isolated step-down converter configured to convert the primary DC voltage into a second DC voltage that charges the rechargeable battery 500 to reach a nominal value of the terminal voltage. Please note that the terminal voltage of the rechargeable battery 500 may be slightly less than the nominal value because the rechargeable battery 500 ages or an ambient temperature is below an optimum operating temperature. When the rechargeable battery 500 badly ages or goes wrong, the terminal voltage may be far from the nominal value. That is why the rechargeable battery test is needed to ensure that the rechargeable battery 500 is working all the time, even in an event of power outage. The bidirectional circuit 703 comprises one or more electronic switches 720 configured to control a forward electric current and a reverse electric current to and from the rechargeable battery 500. In the bidirectional circuit 703, the one or more electronic switches 720 comprise a first electronic switch 721 and a second electronic switch 722. The first electronic switch 721 is configured to receive a first set of one or more signals from the primary control circuit 702 via a link 408 to regulate the forward electric current to the rechargeable battery 500 via the second electronic switch 722. The primary control circuit 702 further comprises a test portion 742 configured to examine a fraction of the terminal voltage on the rechargeable battery 500. When a rated terminal voltage is reached, the primary control circuit 702 is configured to disable a charging process via the bidirectional circuit 703. Conversely. when the terminal voltage drops below the rated terminal voltage, the primary control circuit 702 is configured to enable a charging process via the bidirectional circuit 703. The primary control circuit 702 may further comprise a line-voltage monitor configured to detect whether the line voltage is available or not. According to this information, the primary control circuit 702 is configured to enable and to disable the boost converter circuit 760. In FIG. 1, enabling the boost converter circuit 760 comprises two processes. First, the bidirectional circuit 703 must control the reverse electric current from the rechargeable battery 500 to reach the boost converter circuit 760 via a link 407. Second, the primary control circuit 702 must send a logically-high level signal to the boost converter circuit 760 via a port "C". In FIG. 1, the ground reference 256 is electrically coupled to the low-potential electrode 502 to ease a charging current to flow into the rechargeable battery 500 and to return to the major power source 704, completing a power transfer.

In FIG. 1, the primary control circuit 702 comprises a second control circuit 730 comprising a third electronic switch 731 and a fourth electronic switch 732. The third electronic switch 731 and the fourth electronic switch 732 are configured to control whether the second LED driving current is supplied into the one or more LED arrays 214 or not. The third electronic switch 731 is configured to turn on the fourth electronic switch 732, thereby allowing the second LED driving current to flow into the one or more LED arrays 214. The second control circuit 730 may further comprise a signaling device 733 configured to enable and disable the fly-back converter circuit 303 via a link 404. That is, when the boost converter circuit 760 is turned on by the primary control circuit 702, the signaling device 733 sends a signal to turn off the fly-back converter circuit 303, and vice versa. The fourth electronic switch 732 may comprise at least one metal-oxide-semiconductor field-effect transistor (MOSFET) configured to couple between the fly-back converter circuit 303 and the one or more LED arrays 214 and to controllably relay the second LED driving current to reach the one or more LED arrays 214 via a loop from a port 206, a down-link 405, the fourth electronic switch 732, an uplink 406, to the port of LED+. The third electronic switch 731 may comprise at least one bipolar junction transistor (BJT) coupled to the at least one MOSFET and configured to receive the logic high level or the logic low level to respectively turn the at least one MOSFET on or off. When the at least one MOSFET is turned off, the second LED driving current is interrupted with an output of the fly-back converter circuit 303 open-circuited. The second control circuit 730 may be configured to forbid the second LED driving current to flow into the one or more LED arrays 214 during the rechargeable battery test.

In FIG. 1, the primary control circuit 702 further comprises a self-diagnostic circuit 740 comprising one or more timers 741. Each of the one or more timers 741 respectively comprises multiple time delays, wherein the multiple time delays of each of the one or more timers 741 respectively further comprise a first time delay and a second time delay, wherein, upon an initiation of each of the one or more timers 741, the first time delay begins with an input voltage applied on the self-diagnostic circuit 740, wherein, at an end of the first time delay, the output of the self-diagnostic circuit 740 is activated to reach the logic high level and remains activated so as to enable the boost converter circuit 760 for the second time delay, wherein, at an end of the second time delay, the output of the self-diagnostic circuit 740 is inactivated to drop to the logic low level, and wherein a duration over the second time delay is configured to allow the self-diagnostic circuit 740 to integrate with the test portion 742 and to perform a rechargeable battery test. When the rechargeable battery test is initiated, the second control circuit 730 is configured to forbid the second LED driving current to flow into the one or more LED arrays 214. The primary control circuit 702 further comprises a peripheral circuit configured to sample a fraction of the LED forward voltage and to deliver to the test portion 742 to examine over the duration of the next time delay when the rechargeable battery test is initiated. The primary control circuit 702 further comprises at least one status indicator 734 configured to show a result of the rechargeable battery test. The primary control circuit 702 further comprises a test switch 735 configured to manually initiate the rechargeable battery test. When the rechargeable battery test is manually initiated, the self-diagnostic circuit 740 is configured to ignore the first time delay and to activate the output of the self-diagnostic circuit 740 to reach the logic high level and remains activated so as to enable the boost converter circuit 760 for the second time delay, wherein, at an end of the second time delay, the output of the self-diagnostic circuit 740 is inactivated to drop to the logic low level, and wherein a duration over the second time delay is configured to allow the self-diagnostic circuit 740 to integrate with the test portion 742 and to perform a rechargeable battery test, as mentioned above. The test switch 735 is further configured to manually cause or trigger the self-diagnostic circuit 740 to terminate the rechargeable battery test that is in progress.

The emergency-operated portion 810 may further comprise a voltage regulator 751 configured to adapt either an output voltage from the major power source 704 or the terminal voltage to an operating voltage of the primary control circuit 702 to operate thereof. An operation of the voltage regulator 751 involves a power switching between the major power source 704 and the rechargeable battery 500 via the bidirectional circuit 703. When the rechargeable battery test is performed, the bidirectional circuit 703 controls the reverse electric current from the rechargeable battery 500 to flow at the port "A" and the voltage regulator 751 automatically receives the power from the rechargeable battery 500 to adapt the terminal voltage to the operating voltage of the primary control circuit 702 to operate thereof. In the normal mode, the forward electric current is allowed to flow into the rechargeable battery 500. When the forward electric current appears at the port "A", the voltage regulator 751 automatically receives the output voltage from the major power source 704 to adapt the output voltage from the major power source 704 to the operating voltage of the primary control circuit 702 to operate thereof.

In FIG. 1, the boost converter circuit 760 comprises one or more switches 764, an inductor 761, a boost control circuit 763, and at least one capacitor 765. The boost converter circuit 760 is configured to cut off a constant source of power from the rechargeable battery 500 into controllable increments of energy pulses, followed by the at least one capacitor 765 to filter and to rebuild the controllable increments of energy pulses back into a regulated source of usable output power providing a first LED driving current to drive the one or more LED arrays 214. Specifically, the boost converter circuit 760 is configured to rebuild the controllable increments of energy pulses back into a regulated output voltage greater than the forward voltage with a first LED driving current. The boost converter circuit 760 may comprise a diode 762 configured to block an output current when the one or more switches 764 is closed. When the one or more switches 764 is opened, the diode 762 is configured to conduct the output current and to boost an output voltage greater than the forward voltage of the one or more LED arrays 214. In this sense, the diode 762 may function as a switch. The one or more switches 764 may include such a switch. See FIG. 5 for further discussions. In FIG. 1, an output port "B" of the boost converter circuit 760 is directly coupled to LED+. This means that the one or more LED arrays 214 is configured to receive the first LED driving current from the boost converter circuit 760 as long as the boost converter circuit 760 is enabled and operated.

Figure 2:
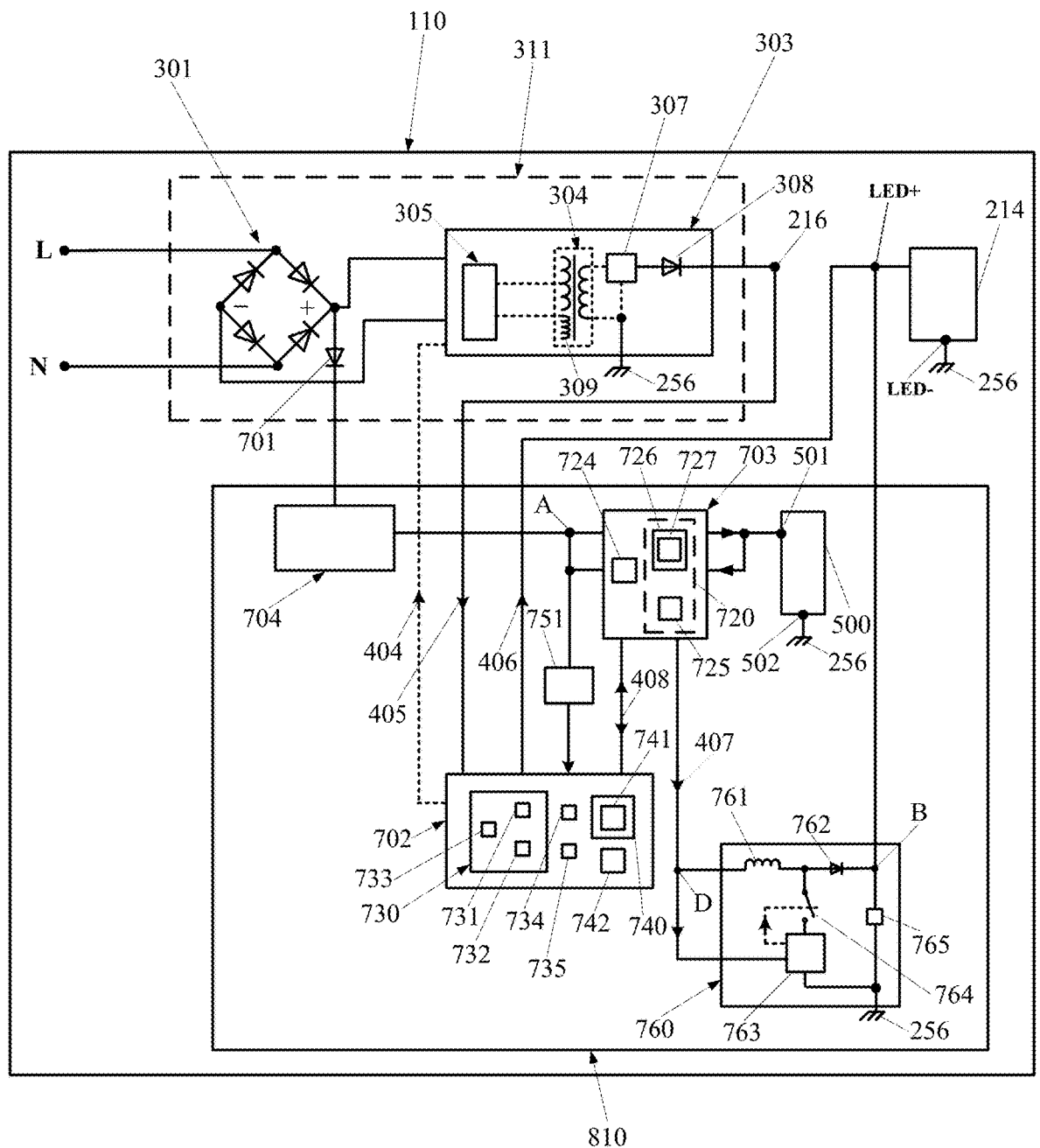
FIG. 2 is a second embodiment of the linear LED lamp according to the present disclosure.

FIG. 2 is a second embodiment of the linear LED lamp according to the present disclosure. FIG. 2 is almost the same as FIG. 1, except that the bidirectional circuit 703 in FIG. 2 further comprises a first control circuit 724 configured to regulate the forward electric current to flow into the rechargeable battery 500. The one or more electronic switches 720 comprise a first set of one or more electronic switches 725 and a second set of one or more electronic switches 726. The forward electric current is allowed to flow into the rechargeable battery 500 via the second set of one or more electronic switches 726. The first set of one or more electronic switches 725 are configured to receive a second set of one or more signals sent from the primary control circuit 702 and to allow the reverse electric current to flow out of the rechargeable battery 500. The second set of one or more electronic switches 726 comprise at least one transistor circuit 727 configured to activate the boost converter circuit 760. In other words, the bidirectional circuit 703 is configured to receive the second set of one or more signals from the primary control circuit 702 and to allow the reverse electric current to flow out of the rechargeable battery 500 and to apply the terminal voltage to the boost converter circuit 760 to supply with energy and power up the boost control circuit 763 to activate the boost converter circuit 760 via a port "D".

Figure 3:
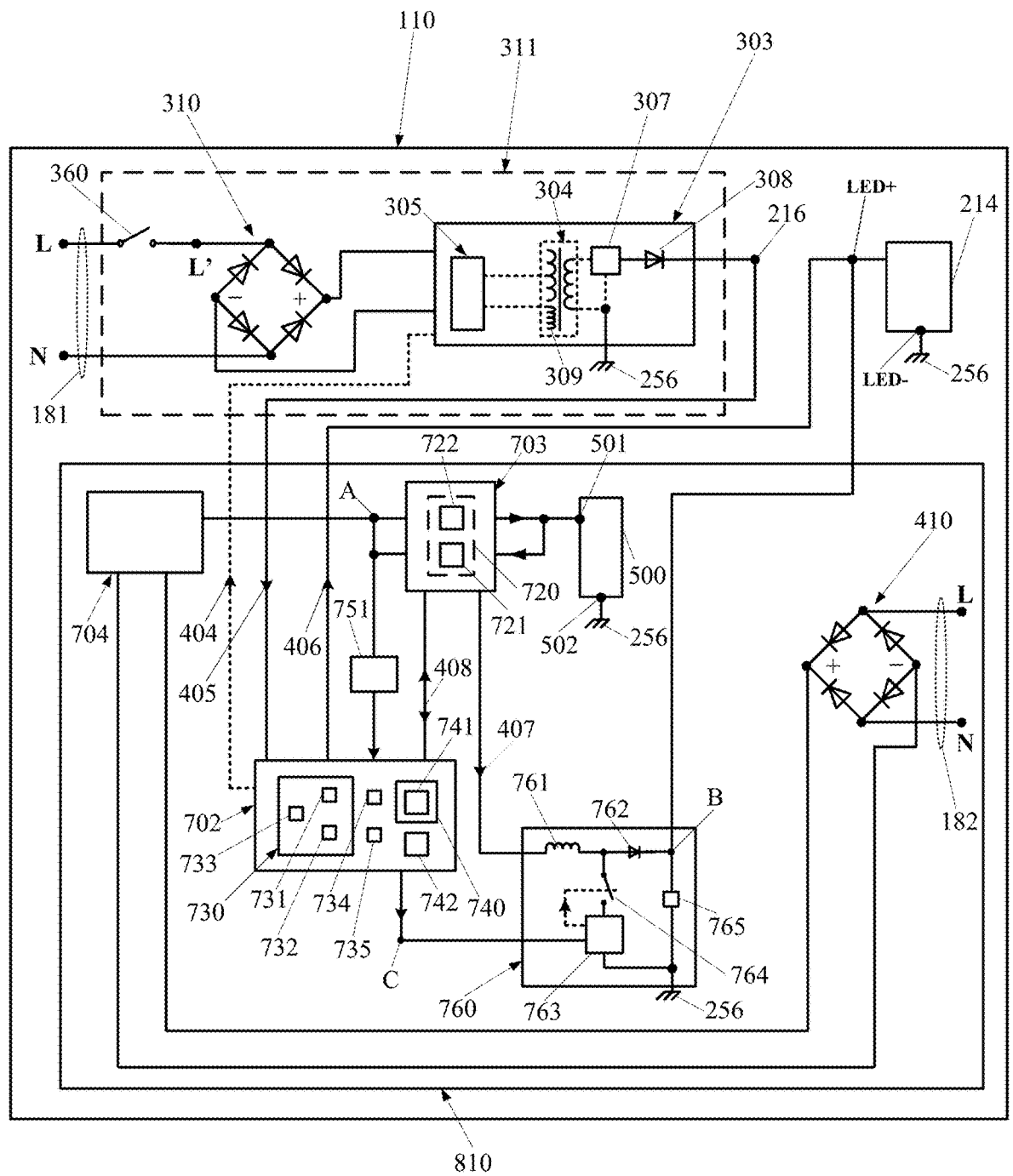
FIG. 3 is a third embodiment of the linear LED lamp according to the present disclosure.

FIG. 3 is a third embodiment of the linear LED lamp according to the present disclosure. FIG. 3 is almost the same as FIG. 1, except that the major power source 704 in FIG. 3 is configured to receive a power from a second full-wave rectifier 410, taking advantages of two independent power sources from two different full-wave rectifiers such that the normally-operated portion 311 can be turned off at any time without affecting functionality of the emergency-operated portion 810. In FIG. 3, the normally-operated portion 311 comprises at least two electrical conductors "L" and "N", a first full-wave rectifier 310, and the fly-back converter circuit 303. The at least two electrical conductors "L" and "N" are configured to couple to "L" and "N" via a power switch 360. The first full-wave rectifier 310 is configured to convert the line voltage from the AC mains into a primary DC voltage. In other words, the at least two electrical conductors "L" and "N" are coupled to a switched power, in which the normally-operated portion 311 can be turned off when the linear LED lamp 110 is not in use any time In FIG. 3, the linear LED lamp further comprises a first end 181 and a second end 182 opposite to the first end 181.

The first full-wave rectifier 310 and the second full-wave rectifier 410 are configured to independently receive the line voltage, with the first full-wave rectifier 310 from a switched line voltage and with the full-wave rectifier 410 from an un-switched line voltage. Either of the first end 181 and the second end 182 comprises at least two electrical conductors, wherein each of the at least two electrical conductors is respectively coupled to the first full-wave rectifier 310 and the second full-wave rectifier 410. The second full-wave rectifier 410 is thus configured to power the major power source 704 at all times. The second full-wave rectifier 410 is coupled to the at least two electrical conductors "L" and "N" and configured to convert the line voltage into a main DC voltage. The rechargeable battery 500 comprises a high-potential electrode 501 and a low-potential electrode 502 with a terminal voltage across thereon. The major power source 704 is an isolated step-down converter.

Figure 4:
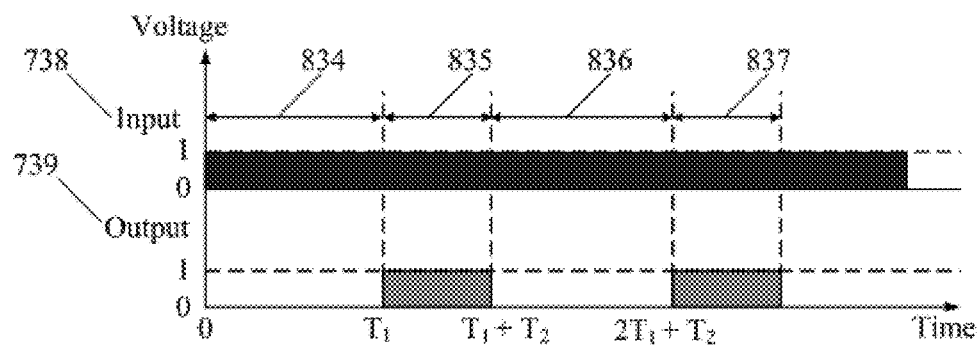
FIG. 4 is a timing diagram of a self-diagnostic circuit according to the present disclosure.

FIG. 4 is a timing diagram of a self-diagnostic circuit according to the present disclosure. As mentioned in depicting FIG. 1, the self-diagnostic circuit 740 comprises the one or more timers 741, and the test portion 742, which, in one embodiment, may be implemented in hardware as an electronic circuit. Each of the one or more timers 741 respectively comprises multiple time delays comprising at least one initial time delay 834 with a duration of $T_1$ and a next time delay 835 with a duration of $T_2$ immediately followed the at least one initial time delay 834. Upon an initiation of each of the one or more timers 741, the at least one initial time delay 834 begins with an input voltage 738 applied. At the end of the at least one initial time delay 834, an output 739 of the self-diagnostic circuit 740 is activated to reach the logic high level (i.e. "1" state) and remains activated so as to enable the boost converter circuit 760, and the test portion 742 for the next time delay 835. At the end of the next time delay 835, the output 739 of the self-diagnostic circuit 740 is inactivated to drop to the logic low level (i.e. "0" state). The at least one initial time delay 834 and the next time delay 835 form a primary sequence with a duration of $T_1+T_2$. The primary sequence with the duration of $T_1+T_2$ repeats (836 and 837, for example) until the terminal voltage (FIG. 1) is removed from the self-diagnostic circuit 740. In FIG. 4, the input 738 shown comprises two states "0" and "1", in which "0" means no voltage appeared at the input 738 of the self-diagnostic circuit 740 whereas "1" means the terminal voltage is applied. Similarly, the output 739 shown comprises two states "0" and "1", in which "0" means no voltage appeared or being inactivated at the output 739 of the self-diagnostic circuit 740 whereas "1" means that the output 739 of the self-diagnostic circuit 740 provides an output high-level voltage or is activated. The duration $T_2$ over the next time delay 835 is configured (e.g., being sufficiently long) to allow the self-diagnostic circuit 740 to perform the rechargeable battery test. In other words, the self-diagnostic circuit 740 sends the output high-level voltage to enable the boost converter circuit 760 via the port "C" (in FIG. 1 and FIG. 3) or via the port "D" (in FIG. 2) during the next time delay 835. The respective at least one initial time delay 734 comprises a nominal duration of 30 days. The respective next time delay 835 comprises a nominal duration of 30 seconds. The primary sequence with the duration of $T_1+T_2$ repeats (836 and 837, for example) 11 times. At the twelfth time, the respective next time delay 835 comprises a nominal duration of 90 minutes. Afterwards, the primary sequence repeats until the terminal voltage (FIG. 1) is removed from the self-diagnostic circuit 740.

Figure 5:
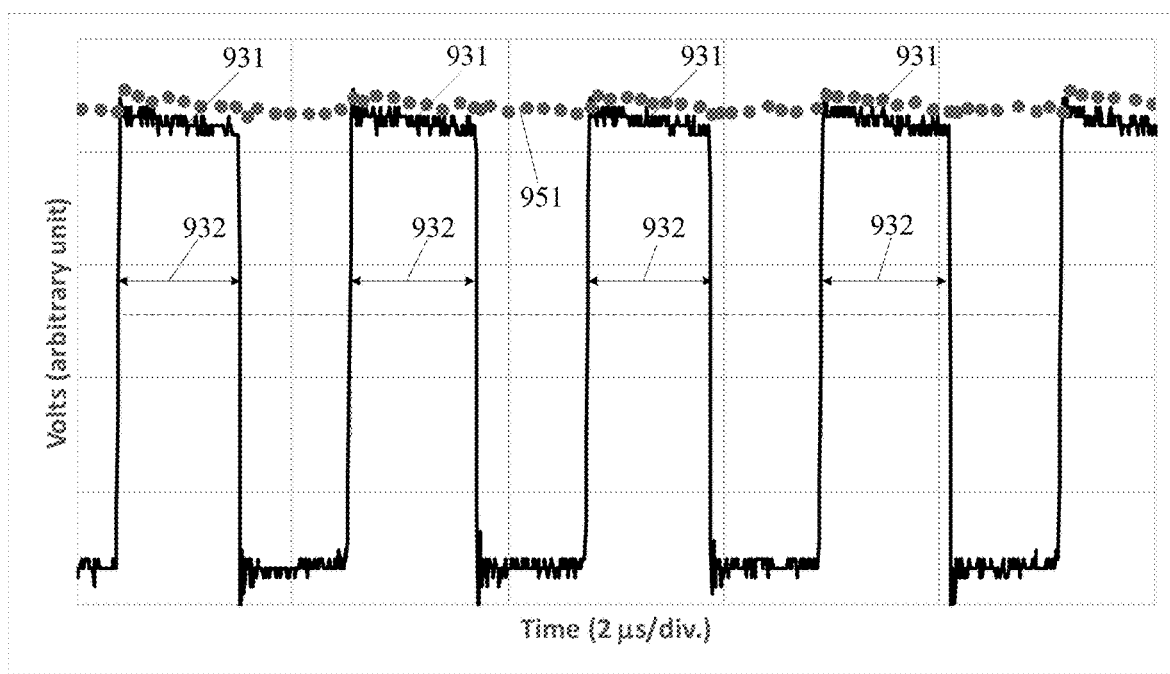
FIG. 5 is controllable increments of energy pulses and a regulated source of usable output power providing a first LED driving current according to the present disclosure.

FIG. 5 is controllable increments of energy pulses and a regulated source of usable output power providing a first LED driving current according to the present disclosure. In FIG. 5, the boost converter circuit 760 cuts off a constant source of power from the rechargeable battery 500 into a plurality of controllable increments of energy pulses 931, followed by a filter associated with the at least one capacitor 765 (in FIGS. 1-3) to rebuild the plurality of controllable increments of energy pulses 931 back into a regulated output voltage 951, which is a usable output power source providing the first LED driving current. In FIG. 5, each of the plurality of controllable increments of energy pulses 931 comprises an on-time duration 932 of 1.15 microseconds (μs). The at least one capacitor 765 filters the plurality of controllable increments of energy pulses 931 back into the regulated output voltage 951, which is greater than the forward voltage across the one or more LED arrays 214 to operate thereon.

The self-diagnostic circuit 740 may comprise a microcontroller, a microchip, or a programmable logic controller. In this disclosure, the emergency-operated portion 810 is integrated into the linear LED lamp 110 with the self-diagnostic circuit 740 to auto-test charging and discharging current of a rechargeable battery 500 with test results displayed in a status indicator, supporting dual mode operations of the linear LED lamp 110 to work not only in a normal mode but also in an emergency mode.

Whereas preferred embodiments of the present disclosure have been shown and described, it will be realized that alterations, modifications, and improvements may be made thereto without departing from the scope of the following claims. Another kind of schemes with an emergency-operated portion with bidirectional circuits and multiple timers and multiple time delays adopted to operate a linear LED lamp using various kinds of combinations to accomplish the same or different objectives could be easily adapted for use from the present disclosure. Accordingly, the foregoing descriptions and attached drawings are by way of example only and are not intended to be limiting.

What is claimed is:
1. A linear light-emitting diode (LED) lamp, comprising:
at least two electrical conductors configured to couple to a line voltage from alternate-current (AC) mains;
one or more LED arrays with a forward voltage across the one or more LED arrays;
a rechargeable battery with a terminal voltage across thereon;
at least one full-wave rectifier coupled to the at least two electrical conductors and configured to convert the line voltage into a primary direct-current (DC) voltage;
a bidirectional circuit comprising one or more electronic switches and configured to control a forward electric current and a reverse electric current to and from the rechargeable battery, respectively;
a boost converter circuit comprising a boost control circuit, one or more switches, an inductor, and at least one capacitor, the boost converter circuit configured to cut off a constant source of power from the rechargeable battery into controllable increments of energy pulses, followed by the at least one capacitor rebuilding the controllable increments of energy pulses back into a regulated output voltage greater than the forward voltage with a first LED driving current;
a fly-back converter circuit comprising a transformer, the fly-back converter circuit configured to generate a second LED driving current to power up the one or more LED arrays at a full power when the line voltage is available;

a primary control circuit configured to control the bidirectional circuit and to enable the boost converter circuit to operate when a rechargeable battery test is performed; and a major power source configured to couple to the at least one full-wave rectifier and to provide a DC power to the bidirectional circuit and the rechargeable battery.

2. The linear light-emitting diode (LED) lamp of claim 1, wherein the one or more electronic switches comprise a first electronic switch and a second electronic switch, and wherein the first electronic switch is configured to receive a first set of one or more signals from the primary control circuit to regulate the forward electric current to flow into the rechargeable battery via the second electronic switch.

3. The linear light-emitting diode (LED) lamp of claim 1, wherein the bidirectional circuit further comprises a first control circuit configured to regulate the forward electric current to flow into the rechargeable battery.

4. The linear light-emitting diode (LED) lamp of claim 3, wherein the one or more electronic switches comprise a first set of one or more electronic switches and a second set of one or more electronic switches, and wherein the forward electric current is allowed to flow into the rechargeable battery via the first set of one or more electronic switches.

5. The linear light-emitting diode (LED) lamp of claim 4, wherein the second set of one or more electronic switches are configured to receive a second set of one or more signals from the primary control circuit and to allow the reverse electric current to flow out of the rechargeable battery.

6. The linear light-emitting diode (LED) lamp of claim 5, wherein the second set of one or more electronic switches comprise at least one transistor circuit configured to activate the boost converter circuit.

7. The linear light-emitting diode (LED) lamp of claim 1, wherein the primary control circuit comprises a second control circuit comprising a third electronic switch and a fourth electronic switch, and wherein the third electronic switch and the fourth electronic switch are configured to control whether the second LED driving current is supplied into the one or more LED arrays or not.

8. The linear light-emitting diode (LED) lamp of claim 7, wherein the third electronic switch is configured to turn on the fourth electronic switch, thereby allowing the second LED driving current to flow into the one or more LED arrays.

9. The linear light-emitting diode (LED) lamp of claim 8, wherein the fourth electronic switch comprises at least one metal-oxide-semiconductor field-effect transistor (MOSFET) configured to couple between the fly-back converter circuit and the one or more LED arrays and to controllably relay the second LED driving current to reach the one or more LED arrays.

10. The linear light-emitting diode (LED) lamp of claim 9, wherein the third electronic switch comprises at least one bipolar junction transistor (BJT) coupled to the at least one MOSFET and configured to receive a logic high level or a logic low level to respectively turn the at least one MOSFET on or off, and wherein, when the at least one MOSFET is turned off, the second LED driving current is interrupted with an output of the fly-back converter circuit open-circuited.

11. The linear light-emitting diode (LED) lamp of claim 7, wherein the second control circuit is configured to forbid the second LED driving current to flow into the one or more LED arrays during the rechargeable battery test.

12. The linear light-emitting diode (LED) lamp of claim 7, wherein the second control circuit further comprises a signaling device configured to enable and disable the fly-back converter circuit.

13. The linear light-emitting diode (LED) lamp of claim 1, wherein the primary control circuit further comprises a self-diagnostic circuit comprising one or more timers, wherein each of the one or more timers respectively comprises multiple time delays, wherein the multiple time delays respectively further comprise a first time delay and a second time delay, wherein, upon an initiation of each of the one or more timers, the first time delay begins with an input voltage applied on the self-diagnostic circuit, wherein, at an end of the first time delay, an output of the self-diagnostic circuit is activated to reach a logic high level and remains activated so as to enable the boost converter circuit for the second time delay, wherein, at an end of the second time delay, the output of the self-diagnostic circuit is inactivated to drop to a logic low level to disable the boost converter circuit, and wherein a duration over the second time delay is configured to allow the self-diagnostic circuit to perform the rechargeable battery test.

14. The linear light-emitting diode (LED) lamp of claim 13, wherein the primary control circuit further comprises a test portion configured to examine a fraction of the terminal voltage on the rechargeable battery over a duration of the second time delay when the rechargeable battery test is initiated.

15. The linear light-emitting diode (LED) lamp of claim 1, wherein the linear LED lamp further comprises a first end and a second end opposite to the first end, wherein the at least one full-wave rectifier further comprises a first full-wave rectifier and a second full-wave rectifier each configured to independently receive the line voltage, wherein either of the first end and the second end comprises at least two electrical conductors, wherein each of the at least two electrical conductors is respectively coupled to the first full-wave rectifier and the second full-wave rectifier, and wherein the second full-wave rectifier is configured to power the major power source at all times.

16. The linear light-emitting diode (LED) lamp of claim 1, wherein the primary control circuit further comprises at least one status indicator configured to show a result of the rechargeable battery test.

17. The linear light-emitting diode (LED) lamp of claim 1, wherein the primary control circuit further comprises a test switch configured to manually initiate the rechargeable battery test.

18. The linear light-emitting diode (LED) lamp of claim 17, wherein the test switch is further configured to manually cause the self-diagnostic circuit to terminate the rechargeable battery test that is in progress.

19. The linear light-emitting diode (LED) lamp of claim 1, wherein the linear LED lamp further comprises a voltage regulator configured to automatically receive the forward electric current and the reverse electric current to and from the rechargeable battery, respectively, and to adapt either an output voltage from the major power source or the terminal voltage to an operating voltage of the primary control circuit to operate thereof.

* * * * *